No. 626,205. Patented May 30, 1899.
E. F. HAMLIN.
LIFTING JACK.
(Application filed Feb. 20, 1899.)

(No Model.)

WITNESSES
Fred Healy.
John A. Coveney

INVENTOR
Edward F. Hamlin
BY Myron Francis Hill
ATTY

THE NORRIS PETERS CO., PHOTO-LITHO., WASHINGTON, D. C.

UNITED STATES PATENT OFFICE.

EDWARD F. HAMLIN, OF BOSTON, MASSACHUSETTS, ASSIGNOR TO ERVIN T. TREFETHEN, OF SAME PLACE.

LIFTING-JACK.

SPECIFICATION forming part of Letters Patent No. 626,205, dated May 30, 1899.

Application filed February 20, 1899. Serial No. 706,092. (No model.)

*To all whom it may concern:*

Be it known that I, EDWARD F. HAMLIN, a citizen of the United States, residing in Boston, county of Suffolk, and State of Massachusetts, have invented a new and useful Improvement in Lifting-Jacks and Particularly in Roller-Bearings Therefor, of which the following is a description.

The object of my invention is to reduce the resistance in the bearings between the head, which is intended to support the weight, and the screw, which is turned for the purpose of raising or lowering the head.

Figure 1:
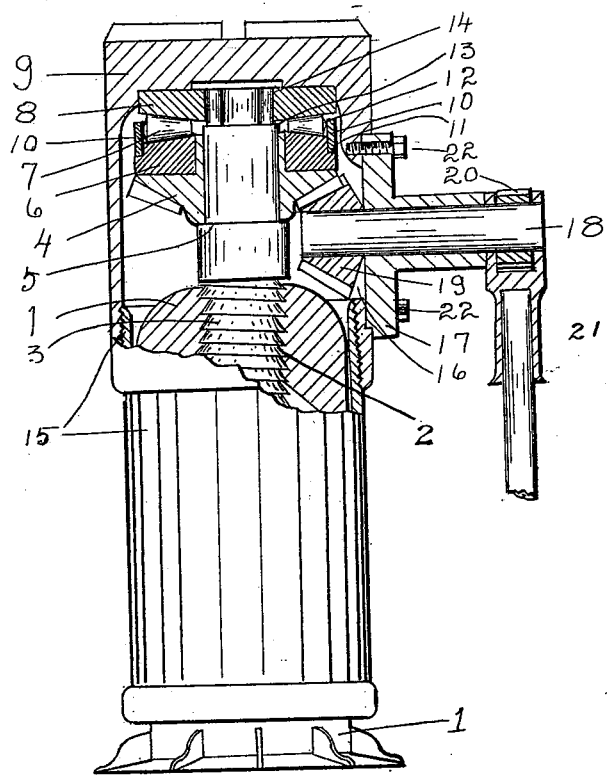
Figure 2:
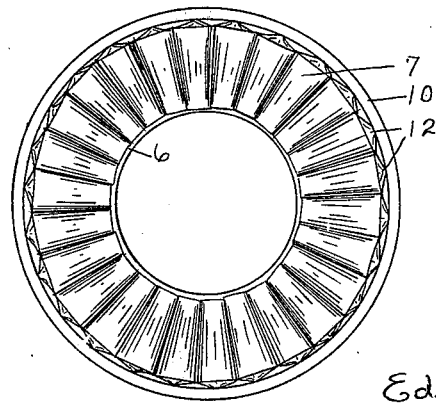

In the drawings, Figure 1 is an elevation of a lifting-jack with parts in section. Fig. 2 is a plan view of the roller-bearing with head and head-plate removed.

In Fig. 1 there is a stand 1, provided with screw-threads 2, in which a screw 3 is fitted. This screw has a bevel-gear 4 fixed to it, resting upon the shoulder 5. Upon the gear 4 is the bearing-plate 6, having its top coned to fit the conical rollers 7. The head bearing-plate 8 is mounted on these rollers, so that when the head 9 is to be lifted the rollers permit the screw to turn easily. The shape of the rollers and bearing-plates is such that the head has a tendency to remain central over the screw. To preserve this tendency, the rollers must be prevented from escaping outwardly. A ring 10 is loosely mounted around the bearing-plate 6 and upon the shoulder 11. The larger ends of the rollers are provided with pivot-points 12 to strike against this ring and turn upon it. The ring thus takes up the end thrust of the rollers. As the screw and bearing-plate 6 are brought into action the ring at times is resting on the shoulder 11 and at times it is carried around by the rollers. In this way it is shifted back and forth with them and the bearing-points 12 of the rollers are not always acting upon the same part of the ring, thus permitting longer wear.

The shank of the screw 3 is provided with a shoulder 13, and rollers 14 keep it central with the head bearing-plate 8; but these may sometimes be omitted.

The head 9 is screwed into the sleeve 15. This sleeve has an opening 16, covered with a plate 17, carrying a shaft 18, with a bevel-pinion 19, engaging the bevel-gear 4 and adapted to turn it. This pinion is keyed to the shaft 18, as is also a ratchet wheel or pinion 20 at the outer end, adapted to be operated by the usual ratchet arm or lever 21, the dog of which is not shown, it being well known in the art. The plate 17 is bolted to the sleeve by bolts 22.

The bearing-plates 6 and 8 and rollers 7, and even the ring 10, may, if desired, be hardened and ground. This is desirable for heavy work.

In operation the working of the arm or lever 21 turns the shaft 18, and the bevel-pinion 19 turns the gear-wheel, which turns the screw 3 in the stand 1. This screw raises or lowers the head, and the roller-bearing between the head, which does not turn, and the screw permits a freedom of action not heretofore attained.

What I claim as my invention, and desire to secure by Letters Patent, is—

In a lifting-jack, a stand, a lifting-screw, a head, an end-thrust bearing containing conical rollers, and bearing-plates, a loosely-mounted ring around the outside of said rollers and traveling therewith, a part of said ring encircling a part of one of said bearing-plates, a shoulder to support said ring, and pivot-points on the outer ends of said rollers to strike against said ring.

Signed by me, at Boston, Massachusetts, this 16th day of February, 1899.

EDWARD F. HAMLIN.

Witnesses:
ERVIN T. TREFETHEN,
MYRON FRANCIS HILL.